United States Patent [19]

Childers

[11] 4,328,989
[45] May 11, 1982

[54] COVER APPARATUS FOR THE CARGO BED OF PICKUP TRUCKS, TRAVEL, TRAILERS AND THE LIKE

[76] Inventor: Roger B. Childers, P.O. Box 507, Methow, Wash. 98834

[21] Appl. No.: 142,440

[22] Filed: Apr. 21, 1980

[51] Int. Cl.³ .............................................. B62D 33/08
[52] U.S. Cl. ...................................... 296/27; 220/23; 224/311; 296/175
[58] Field of Search ...................... 296/3, 22, 165, 171, 296/175, 26, 27; 224/309, 311; 220/23; 403/104, 109; 248/188.5

[56] References Cited

U.S. PATENT DOCUMENTS

| | | | |
|---|---|---|---|
| 2,243,659 | 5/1941 | Thompson | 296/175 |
| 3,674,305 | 7/1972 | Steury | 296/27 |
| 4,167,284 | 9/1979 | Messina | 224/309 |

*Primary Examiner*—Joseph F. Peters, Jr.
*Assistant Examiner*—John A. Carroll
*Attorney, Agent, or Firm*—Christensen, O'Connor, Johnson & Kindness

[57] ABSTRACT

A cover apparatus for the cargo bed of a vehicle, such as a pickup truck (11), travel trailer and the like, comprising a top (13) and a mechanism (15) for raising and lowering the top is disclosed. The top may comprise a structurally stiff planar sheet suitable for supporting a relatively large storage container (121) affixed to the lower surface thereof; or, a relatively lightweight, low silhouette camper top (17) of the type commonly mounted on the side walls surrounding the bed of a pickup truck. The raising and lowering mechanism (15) comprises telescoping columns (31)—one located in each of the four corners of the cargo bed. Horizontal frame members (41, 43, 45) support the telescoping columns (31) in a vertical position. A driven shaft (69) extends between one pair of columns and is chain coupled to a parallel shaft (81) that extends between the other pair of columns. Each column is fully enclosed and includes a base member (33), at least one intermediate member (35) and an end member (37) telescoped together. The intermediate member (35) is attached to a point on a continuous chain (87) moved by either the driven or the parallel shaft. The end member (37) is connected to one end of a chain (115) that wraps around a sprocket (113) mounted at the end of the intermediate member (35) remote from the base member (33). The other end of the latter chain (115) terminates at the bottom end of the base member (33). When the driven shaft (69) is rotated, the parallel shaft (81) is also rotated. The rotating shafts move the continuous chains (87) to cause relative movement between the intermediate (35) and base (33) members which, in turn, causes relative movement between the intermediate (35) and end (37) members.

20 Claims, 9 Drawing Figures

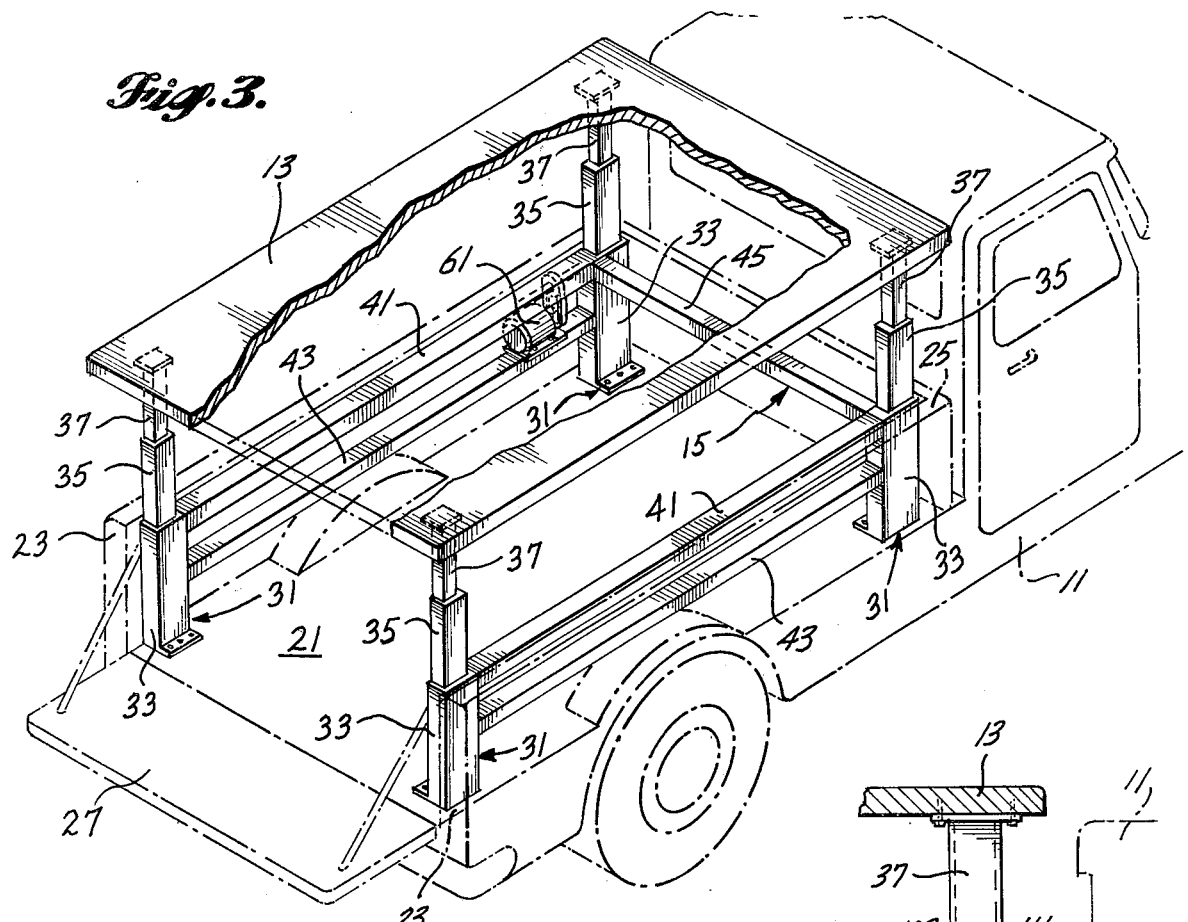

4,328,989

COVER APPARATUS FOR THE CARGO BED OF PICKUP TRUCKS, TRAVEL, TRAILERS AND THE LIKE

TECHNICAL FIELD

This invention relates to pickup truck and trailer apparatus and, more particularly, to apparatus for enclosing the cargo bed of a pickup truck, travel trailer or other vehicle having a cargo bed.

BACKGROUND OF THE INVENTION

In the past, various types of apparatus for enclosing the cargo bed of a pickup truck, travel trailer or the like vehicles have been proposed. Many such apparatus include a mechanism for moving an enclosing top between a low profile traveling position and a high profile use position. While several types of such cargo bed enclosing apparatus have been built and sold, in general, the raising and lowering mechanism of such apparatus have had one or more disadvantages. Specifically, the most common mechanisms used to move a cargo bed enclosing top include a series of telescoping members located at the four corners of the cargo bed. The telescoping members have been raised and lowered by one or the other of various types of pneumatic, hydraulic and mechanical systems.

Pneumatic systems, of course, have the disadvantage that they require a compressor to provide a source of pneumatic power. Further, pneumatic systems are, inherently, relatively weak. While hydraulic systems are substantially stronger than pneumatic systems, they require a hydraulic reservoir and, like pneumatic systems, a plurality of coupling tubes or conduit. And, because hydraulic fluid viscosity changes with temperature, such systems may become difficult to operate at low temperatures if an incorrect hydraulic fluid is used. Further, such systems are relatively expensive.

Mechanical systems, in the past, have often included extendable, flexible mechanical members mounted inside of telescoping tubes for extending and retracting the tube members. Such systems, of course, produce very limited amounts of mechanical force. Finally, proposals have been made to utilize cable/sheave mechanisms in combination with rotatable shafts to extend and retract telescoping tubes. Such systems, of course, also can produce only a limited amount of mechanical force because slippage between the cables and the sheaves occurs when large mechanical forces are attempted.

It will be appreciated from the foregoing brief discussion of prior art mechanisms for raising and lowering cargo bed tops, that, in general, such mechanisms (particularly prior art mechanical mechanisms) produce relatively limited amounts of force. Further, many such mechanisms, particularly pneumatic and hydraulic mechanisms, require a substantial number of supporting mechanisms, all of which are expensive and subject to deterioration and breakage. For example, pneumatic and hydraulic seals are subject to deterioration and often frequent replacement.

In addition to the foregoing disadvantages, many prior art cargo bed raising and lowering systems, in particular mechanical systems, are open to the atmosphere. Consequently, such systems are subject to the effects of dust, dirt, water and other deteriorating items. As a result such mechanisms are subject to jamming and rusting whereby such mechanisms, at best, are unreliable.

Therefore, it is an object of this invention to provide a new and improved apparatus for covering the cargo bed of a pickup truck, travel trailer or other vehicle having a cargo bed.

It is also an object of this invention to provide a new and improved apparatus for covering the cargo bed of a pickup truck, travel trailer or the like vehicle that includes a mechanism for moving an enclosing top between a lower traveling position and an upper use position.

Because of the limited amount of weight that can be lifted by prior art top raising and lowering mechanisms, in the past only relatively lightweight tops have been raised and lowered. This limitation has a number of disadvantages. For example, the top cannot be used to support relatively heavy items, such as cabinets, storage containers and the like. As a result, such items cannot be moved from a lower inaccessible position to a raised accessible position in one step.

Thus, it is a further object of this invention to provide a mechanism for raising and lowering a relatively heavy top from the cargo bed of a pickup truck, travel trailer or the like.

It is yet another object of this invention to provide a new and improved mechanical mechanism for raising and lowering a relatively heavy enclosing top from the cargo bed of a pickup truck, travel trailer or the like that is enclosed to prevent moisture, dirt and the like from entering the mechanism and detrimentally affecting the operation of the mechanism.

It is a still further object of this invention to provide a top suitable for enclosing the cargo bed of a pickup truck, travel trailer or the like adapted to support one or more storage containers mounted beneath the top such that the storage containers can be moved between a concealed position whereat they are enclosed by the side walls of the cargo bed to an accessible position whereat they are above the side walls of the cargo bed.

SUMMARY OF THE INVENTION

In accordance with this invention a cover apparatus for the cargo bed of a vehicle, such as a pickup truck, travel trailer or the like, is provided. The cover apparatus includes a top and a mechanism for raising and lowering the top. The top may be a structurally stiff planar sheet; a relatively low silhouette camper top of the type commonly mounted on the side walls surrounding the bed of a pickup truck; or, any other suitable enclosing structure. The structurally stiff planar sheet may support, for example, a relatively heavy storage container affixed to the lower surface of the sheet. Preferably, such a storage container is formed such that when the stiff planar sheet is positioned atop the side walls of the cargo bed of the vehicle the storage container is concealed and when the top is raised to a predetermined height, the storage container is accessible. A low silhouette camper top can be relatively lightweight or relatively heavy, depending upon its structural configuration. Moreover, if desired, rather than having a low silhouette, the camper top can have a high silhouette. Hence, various types of "tops" can be utilized by the invention.

The raising and lowering mechanism comprises a plurality of telescoping columns, one located in each of the corners of the cargo bed of the vehicle. Horizontal frame members maintain the telescoping columns vertical. A driven shaft extends between one pair of columns and is sprocket/chain connected to a parallel shaft that extends between the other pair of columns. Each telescoping column is fully enclosed and includes a base member, at least one intermediate member, and an end member, all telescoped together. The intermediate member is attached to a point on a continuous chain housed in the base member. The continuous chain is moved by either the driven or the parallel shaft, depending upon which shaft terminates at a particular column. The end member is attached to one end of a chain that is wrapped around a sprocket located at the outer end of the intermediate member. The other end of the latter chain is attached to the bottom end of the base member. When the driven shaft is rotated, the parallel shaft is also rotated. The rotation of the driven and parallel shafts move the continuous chain and, thereby, cause relative movement between the intermediate and base members. Relative movement between the intermediate and base members, in turn, causes relative movement between the intermediate and end members. The end members may directly support the top or may support a frame member that in turn supports the top.

Preferably, at least the intermediate and base members of the telescoping tubes include two chambers. In one of the chambers is mounted the item to be moved, i.e., the intermediate member in the case of the base member and the end member in the case of the intermediate member. The other chambers of the base and intermediate members house part of the movement mechanism. A slot in the wall between the two chambers allows a flange (affixed to the member to be moved) to be attached to the chain/sprocket movement mechanism.

As will be appreciated from the foregoing brief description, the invention provides a new and improved cover apparatus for the cargo bed of a vehicle such as a pickup truck, travel trailer and the like. Because the raising and lowering mechanism uses shafts, chains and sprockets, it is suitable for raising a relatively heavy top. In this regard, most prior art mechanisms utilized to raise a top from the cargo bed of such vehicles are limited to tops weighing 200–300 pounds or less. Contrariwise, a suitably formed embodiment of the present invention can easily raise a top weighing 1,000 pounds or more. As a result, the invention is ideally suited for use in raising a top supporting a relatively heavy storage container attached to the lower surface of the top. Because such a storage container can be sized so as to be enclosed and concealed by the walls of the cargo bed when the top lies atop the walls, a storage apparatus that is secure from theft and vandalism is readily provided by the invention. In addition to a top suitable for supporting a storage container, obviously, the top can take other forms, such as standard camper tops, as noted above.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 3 is a partially broken away perspective view of the preferred embodiment of the invention illustrated in FIGS. 1 and 2 shown without the storage container, mounted in the cargo bed of a pickup truck;

FIG. 4 is a cross-sectional view, partially in section, illustrating a pair of telescoping columns and the drive mechanism therefor, formed in accordance with the invention, for raising the top shown in FIGS. 1-3;

DESCRIPTION OF THE PREFERRED EMBODIMENT

Figure 1:
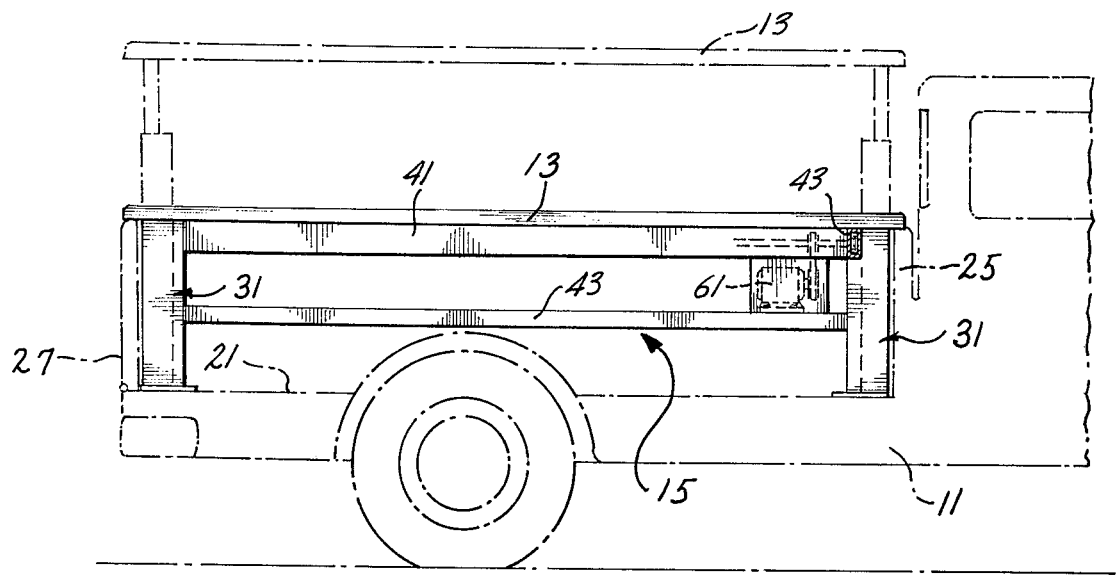
FIG. 1 is a side elevational view of a preferred embodiment of the invention mounted in the cargo bed of a pickup truck.
Figure 2:
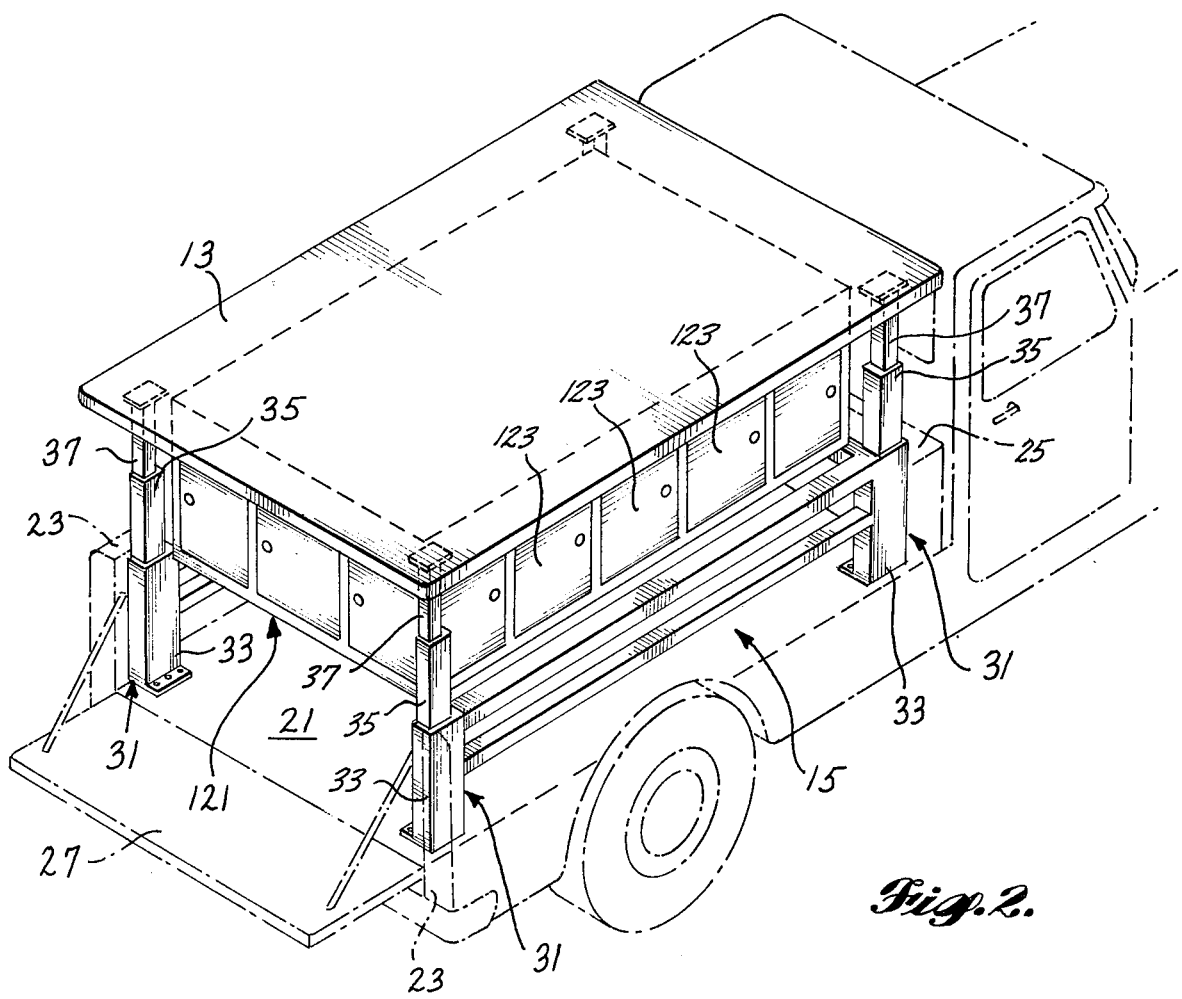
FIG. 2 is a perspective view of the embodiment of the invention illustrated in FIG. 1 showing the cargo bed cover apparatus of the invention in a raised position, whereby a storage compartment hung beneath a structurally rigid top is accessible.
Figure 8:
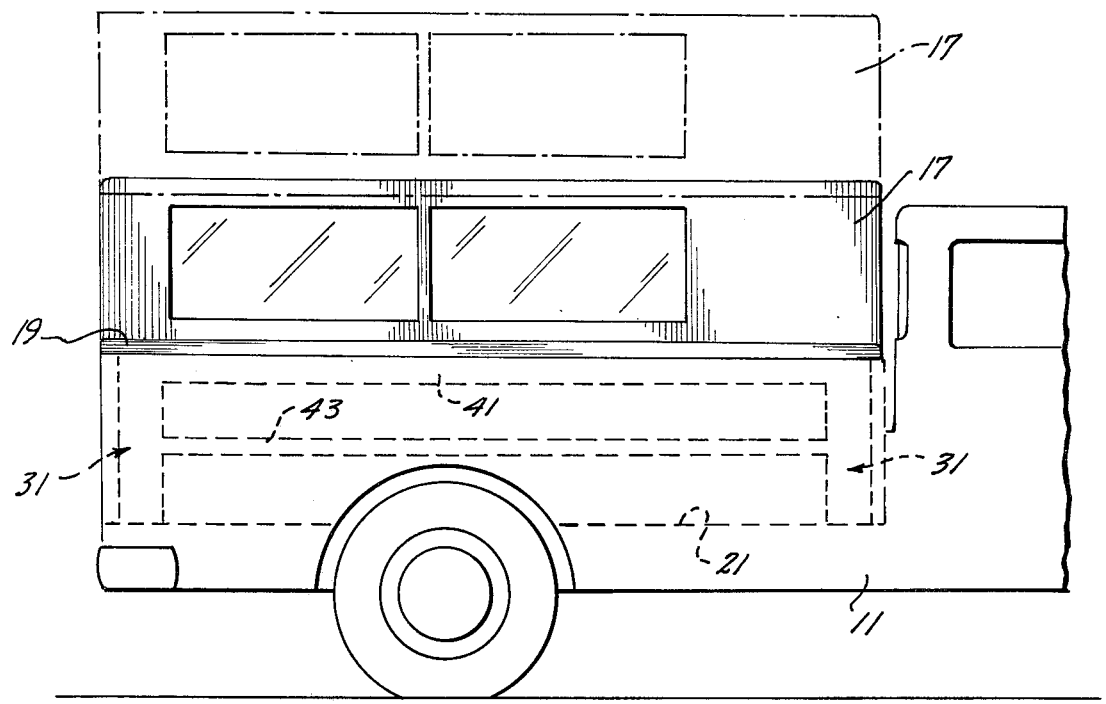
FIG. 8 is a cross-sectional view illustrating a camper top suitable for mounting on a raising and lowering mechanism formed in accordance with the invention; and, FIG. 9 is a perspective view illustrating a support frame mounted atop the telescoping columns of a raising and lowering mechanism formed in accordance with the invention.
Figure 9:
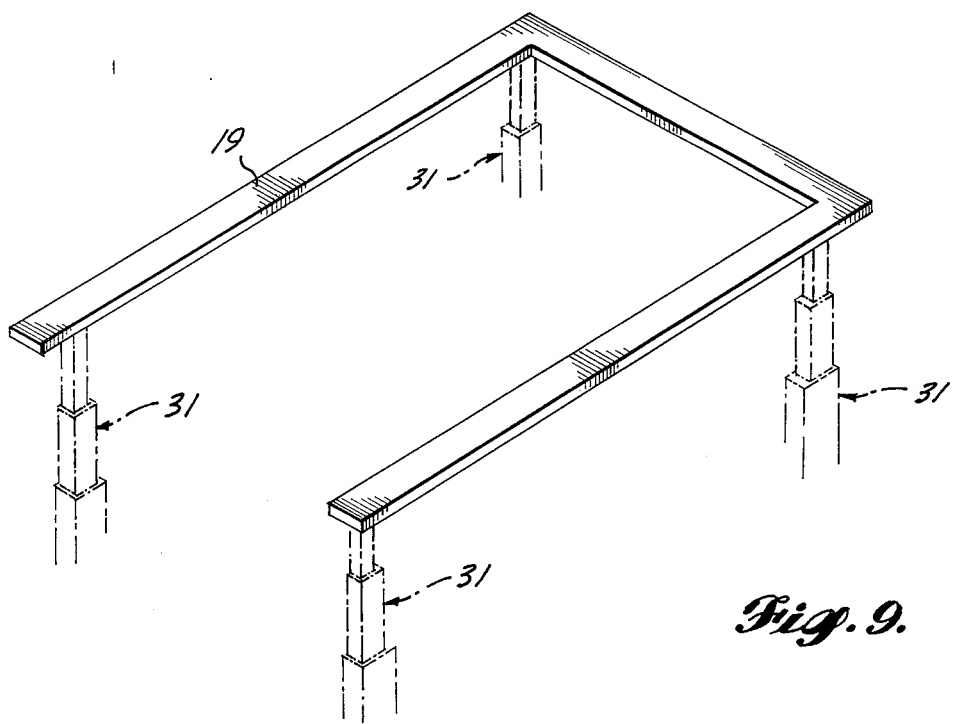

As illustrated in FIGS. 1-3, the invention comprises a cover apparatus for enclosing the cargo bed of a vehicle such as a pickup truck 11. The cover apparatus generally comprises a top 13 and a raising and lowering mechanism 15. The top 13 may comprise: a structurally rigid planar sheet, as illustrated in FIGS. 1-3; a camper top 17, as shown in FIG. 8; or, just a framework 19, as shown in FIG. 9. (The framework is, of course, suitable for supporting an enclosing top.) In addition, it should be noted that while the invention is illustrated as mounted in the cargo bed of a pickup truck, obviously, the invention can be used in combination with the cargo bed of other types of vehicles, such as trailers, for example.

As normal, the cargo bed of the pickup truck illustrated in FIGS. 1-3 includes a bottom 21 surrounded by a pair of opposed side walls 23, a front wall 25 and a tailgate 27. The tailgate 27 is hinged to the rear edge of the floor 21 and is adaptable to be rotated between a vertical position (FIG. 1) and a horizontal position (FIGS. 2 & 3).

Figure 5:
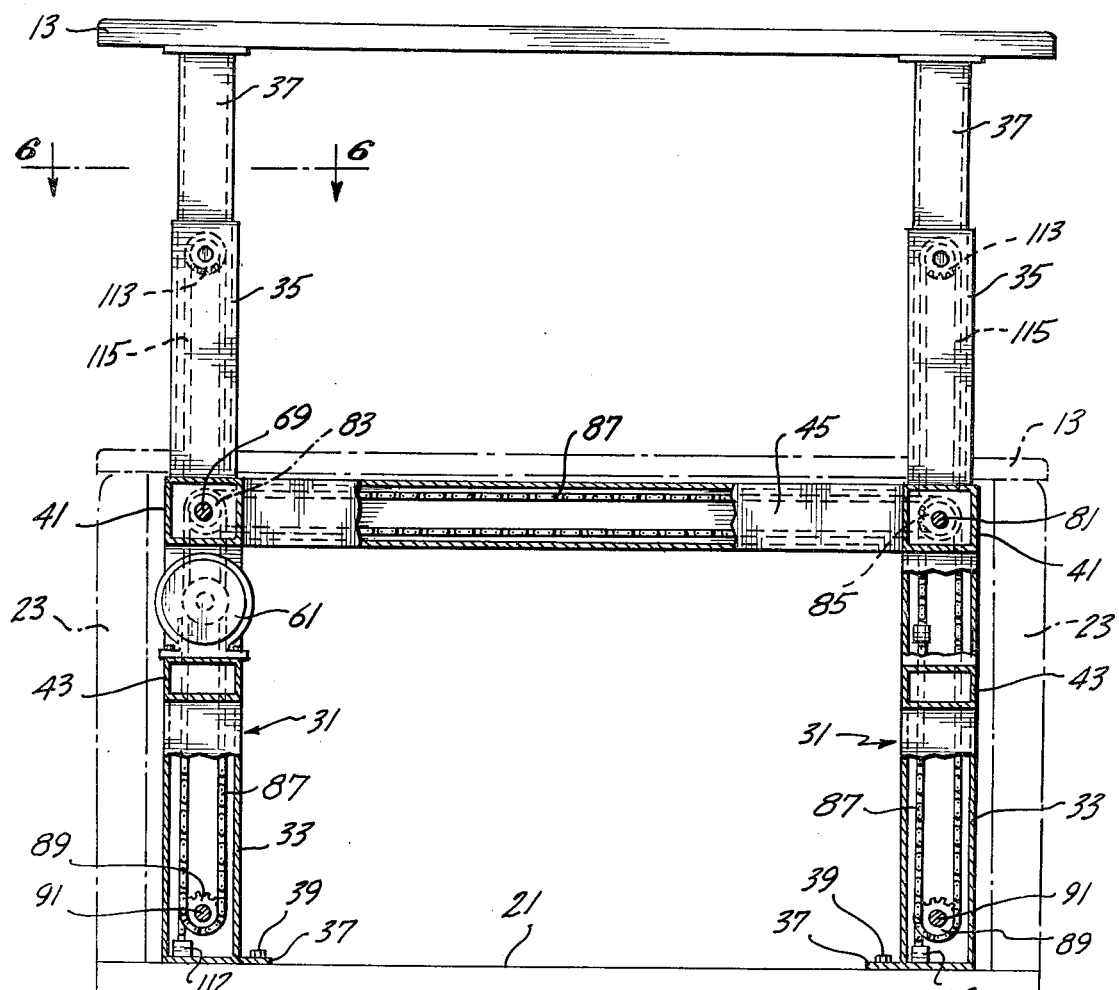
FIG. 5 is a transverse cross-sectional view illustrating two telescoping columns located near the front of the bed of a pickup truck.
Figure 6:
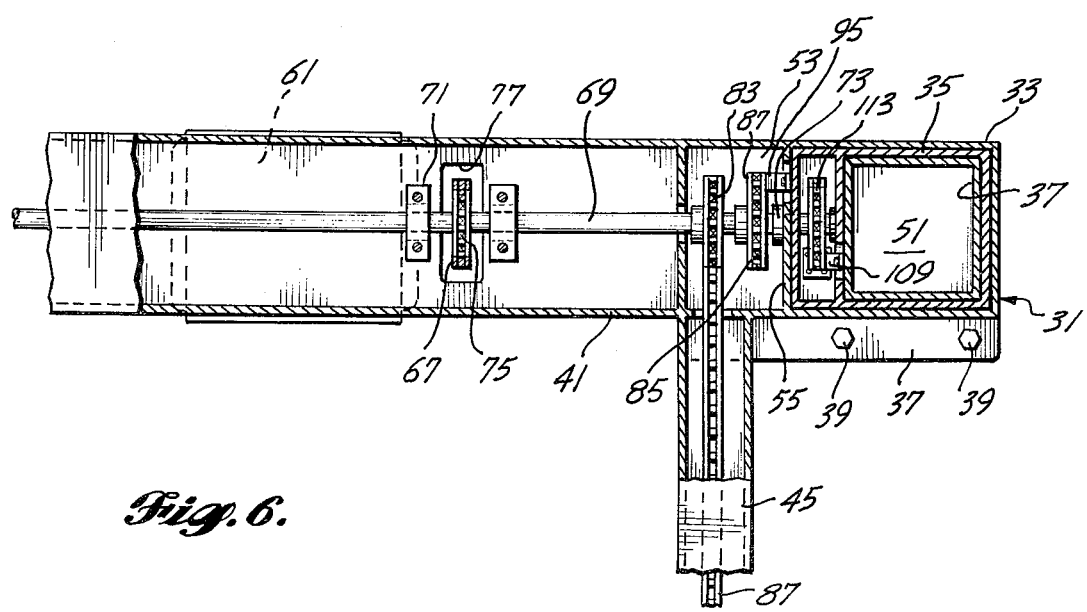
FIG. 6 is a cross-sectional view along lines 6—6 of FIG. 5.
Figure 7:
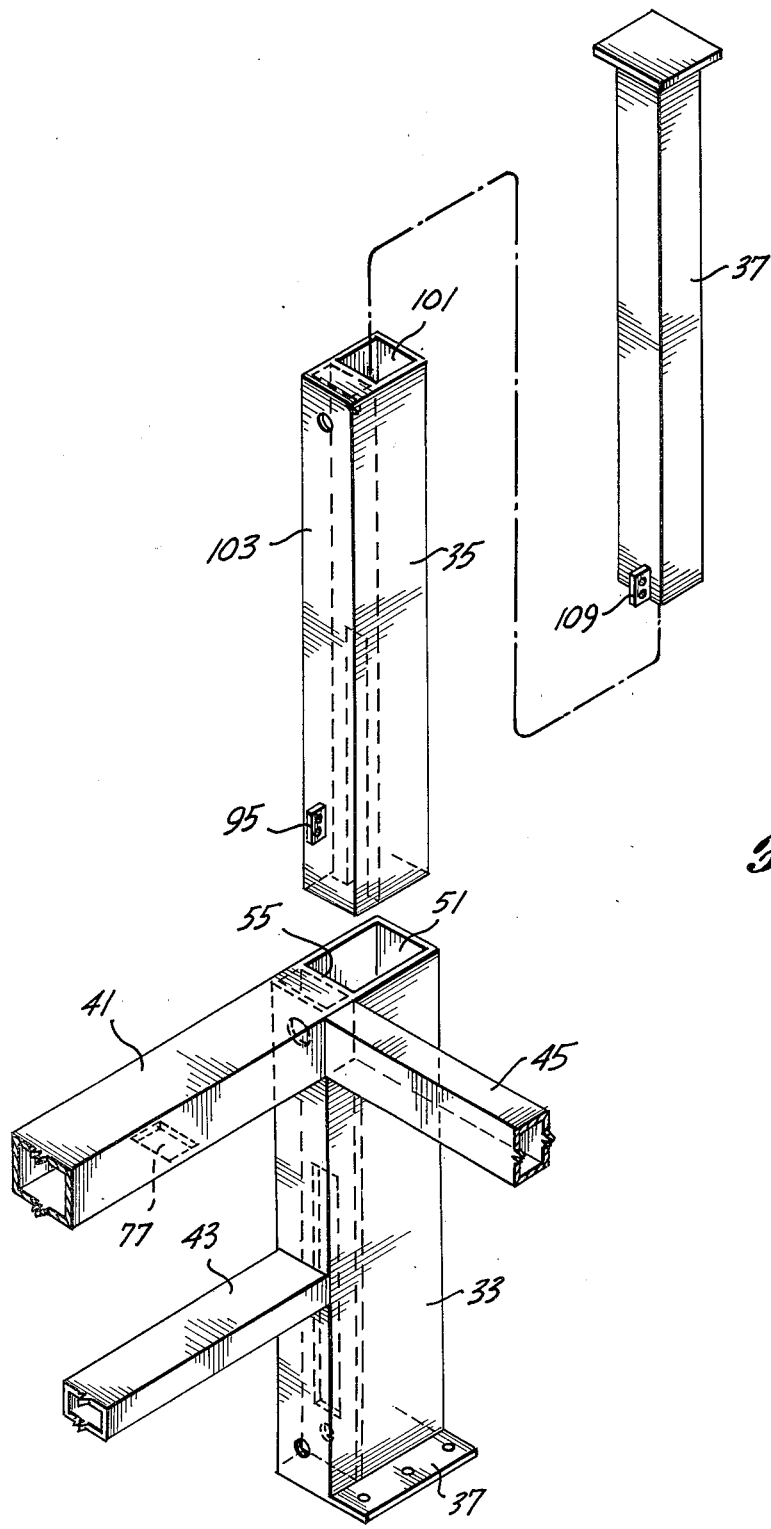
FIG. 7 is an exploded view of the telescoping members forming a telescoping column formed in accordance with the invention.

The raising and lowering mechanism 15 includes a telescoping column 31 located in each of the four corners of the cargo bed of the pickup truck 11. Each of the telescoping columns includes an elongate base member 33, an elongate intermediate member 35 telescoped inside of the base member 33 and an elongate end member 37 telescoped inside of the intermediate member 35. The telescoping columns 31 are vertically oriented and the bottom end of the bases 33 lie atop the floor 21 of the cargo bed. Preferably, as illustrated in FIG. 5, the bottom of the base members 33 include outwardly projecting flanges 37 that are affixed to the floor 21 by bolts 39.

Extending between the pairs of telescoping columns 31 located on either side of the cargo bed are a pair of parallel, side horizontal braces 41 and 43. Thus, the side horizontal braces 41 and 43 lie parallel to the side walls 23 of the cargo bed. The pairs of side horizontal braces are positioned such that one brace lies above the other brace. The ends of the pairs of side horizontal braces are affixed to the base members where they join by welding, for example. Extending between the pair of telescoping columns 31 located adjacent to the front wall 25 of the cargo bed is a front horizontal brace 45. Thus, the front horizontal brace lies inside of the front wall 25 of the cargo bed. As with the pairs of side horizontal braces, the front horizontal brace is affixed (by welding, for example) to the front bace members. In this manner the telescoping columns 31 are rigidly held in place.

As best illustrated in FIGS. 4-7, the base member 33 of each column 31 has a rectangular cross-sectional configuration. In addition, each base member includes two longitudinal chambers 51 and 53 separated by an interior wall 55. The chambers 51 and 53 have rectangular cross-sectional configurations and one of the chambers 51 is somewhat larger in cross-sectional configuration than the other chamber. The upper end of the larger chamber 51 is open and the upper end of the smaller chamber 53 is closed. Further, the interior wall 55 includes a longitudinal slot that starts near the bottom of the base member 33 and extends upwardly for a predetermined distance. For example, the slot may run about one-half ($\frac{1}{2}$) to two-thirds ($\frac{2}{3}$) the length of the base member. The columns are positioned such that the smaller chambers of the front and rear columns, on either side of the cargo bed, face one another. Thus, the side horizontal braces 41 and 43 are affixed to the outer walls of the smaller chambers 53 of the base members 33.

As best illustrated in FIG. 4, mounted atop one of the lower side horizontal braces 43 is a conventional, bidirectional, D.C. electric motor/gear box combination shown as a single element. The output shaft 63 of the motor/gear box combination lies parallel to the longitudinal axes of the related pair of side horizontal braces. Mounted on the output shaft 63 of the motor/gear box combination is a sprocket 65. The sprocket 65 is connected by a drive chain 67 to a driven shaft 69 mounted inside of the side horizontal brace 41 lying immediately above the motor/gear box combination 61. More specifically, the driven shaft 69 runs the entire length of the side horizontal brace 41 inside of which it is mounted; and, extends into the smaller chambers 53 of the column base member 33 affixed to the ends of the side horizontal brace 41. A suitable number of intermediate bearings 71 and a pair of end bearings 73 rotatably support the driven shaft 69. A sprocket 75, mounted on the drive shaft 69 so as to lie above an aperture 77 in the lower surface of the side horizontal brace 41 (which aperture is in alignment with the sprocket 65 mounted on the end of the output shaft 63 of the motor/gear box combination 61), is connected to the motor/gear box combination by the drive chain 67. As a result, the driven shaft 69 rotates when the output shaft 63 of the motor/gear box combination 61 is rotated in one direction or the other. An electric switch controller (not shown) controls the application and direction of the electric power applied to the motor of the motor/gear box combination 61 and, thus, the direction of rotation of the output shaft 63.

Mounted in the upper horizontal brace 41 located on the other side of the cargo bed is a parallel shaft 81 (see FIG. 5). As with the driven shaft 69, the parallel shaft 81 runs the length of the side horizontal brace in which it is mounted and extends into the smaller chamber 53 of the base members 33 affixed to either end of the horizontal brace. The parallel shaft is rotatably supported by bearings located at either end and at intermediate points along the longitudinal length of the parallel shaft. Mounted on both the drive shaft 69 and the parallel shaft 81, in alignment with the front horizontal brace 45, are cross chain sprockets 83 and 85. The cross chain sprockets are connected together by a continuous cross chain 87 that is housed in the front horizontal brace 45. Consequently, as the driven shaft 69 is rotated in one direction or the other by the motor/gear box combination 61, the parallel shaft 81 is rotated in the same direction.

Located near the outer end of both the driven shaft 69 and the parallel shaft 81, so as to lie inside of the smaller chambers 53 of each of the base members 33, is a base chain sprocket 85. The base chain sprockets 85 are each connected by a continuous base chain 87 to an idler sprocket 89 mounted on a stub shaft 91 located near the lower end of the smaller chambers 53 of the base members 33. The base chains 87 parallel the entire length of the slots, located in the inner wall 55 of the base members 33.

The intermediate members 35 of each telescoping column 31 is mounted in the larger chamber 51 of the base member 33 so as to telescope outwardly through the open upper end of the larger chamber. As noted above, the cross-sectional configuration of the larger chamber is rectangular. The cross-sectional configuration of the intermediate member is also rectangular and sized to fit in the larger chamber 51 of the base member 33. The intermediate members 35 each include a flange 95 that extends outwardly from the side of the intermediate member 35 facing the interior wall 55 of the base member 33. The flange 95 is located near the lower end of the intermediate member and extends through the slot 55 in the interior wall of its associated base member. In addition, the flange 95 is positioned such that it lies adjacent one of the longitudinal runs of the continuous base chain 87 and is attached thereto. As a result, as the continuous base chain 87 of each of the telescoping columns 31 is moved in one direction or the other, the associated flange 95 is moved in one direction or the other. Since the flange 95 is affixed to (or forms part of) the intermediate member 35, the intermediate member 35 slides (e.g., telescopes) in one direction or the other in the larger chamber 51 of the related base member 33. Since all of the continuous base chains are driven by a common mechanism formed by the driven and parallel shafts 69 and 81 and the sprockets and cross chain connecting these shafts together, all of the intermediate members of the columns are simultaneously moved in the same direction.

Each of the intermediate members 35 also includes two elongate chambers 101 and 103 separated by an interior wall 105. The lower end of the interior wall 105 includes a slot 107. The chambers 101 and 103 of the intermediate members have a rectangular cross-sectional configuration and one of the chambers 101 is slightly larger than the other chamber 103. The upper ends of the smaller chambers 103 are enclosed. The larger elongate chambers 101 are open topped and receive the end members 37 of the telescoping columns. The end members 37 each include a flange 109 located near their lower (inner) ends. The flanges 109 project through the slot 107 located in the interior wall 105 of the associated intermediate member 35. Mounted on a stub shaft 111 located near the upper end of each of the smaller elongate chamber 103 of the intermediate member 105 is an intermediate sprocket 113. An intermediate chain 115 is wrapped around each intermediate sprocket and both ends drop downwardly inside of the smaller elongate chamber 103. One end of each of the intermediate chains 115 is attached to the flange 109 of the associated end member 37 extending through the slot 107 of the associated intermediate member 35. The other end of each of the intermediate chains 115 is connected to a bracket 112 located at the bottom of the larger chamber 51 of the associated base member 33. As a result of this arrangement, as the intermediate member 35 is moved upwardly or downwardly, the intermediate sprocket 113 is raised or lowered. As the intermediate sprocket 113 is raised or lowered, the end members 37 are raised and lowered accordingly. That is, as the sprockets 113 are raised, for example, the distance between the bracket 112 located at the bottom of the base members 33 and the sprockets 113 is increased. As a result, the distance between the flange 109 and the sprocket 113 is decreased, whereby the end members 37 are moved outwardly with respect to the intermediate members 35. Since the intermediate members 35 are moved by rotating the driven shaft 69 and the parallel shaft 81 in the manner heretofore described, in essence, rotation of these shafts causes telescoping movement of the end members as well as the intermediate members.

As noted above, the motor/gear box combination 61 is bidirectional, i.e., reversible. Consequently, the motor/gear box combination can be used to both extend and retract the telescoping members and, thereby, raise and lower the top 13.

As will be appreciated by those familiar with chain/sprocket coupling mechanisms, a substantial amount of non-slip lifting force can be produced by each of the telescoping columns 31. Forces substantially greater than those that can be coupled by a pulley system can be coupled by a chain/sprocket system. In this regard, force suitable for raising a top weighing one-half ton (1,000 lbs.) or more can be easily coupled by a suitably sized chain/sprocket coupling system of the type illustrated in FIGS. 1-7, assuming a suitably powered motor/gear box combination is provided. It is because of this coupling mechanism that a heavy storage compartment, supported by a suitably rigid cover 13, can be raised and lowered. More specifically, as illustrated in FIG. 2, a storage compartment 121 can be mounted beneath the lower surface of a suitably rigid cover 13. The storage compartment 121 is illustrated as sized so as to substantially entirely fill the cargo bed of the pickup truck 11 when the cover 13 lies atop the walls of the cargo bed. Access to the storage compartment 121 is illustrated as being via a plurality of doors 123. Obviously, the doors could be replaced by drawers, or other enclosing mechanisms, or, a part of the storage compartment (or all of it) could be open when the top is raised. Further, rather than being vertically hinged, as illustrated, the doors could be horizontally hinged or roll-up doors, for examples.

It is pointed out that an arrangement of the type illustrated in FIG. 2 wherein the storage compartment can be entirely hidden by the cover and the side walls and tailgate 27 provides a secure storage arrangement that is not easily vandalized. It is also pointed out that in addition to being relatively strong and rigid, the raising and lowering mechanism of the invention is not subject to deterioration from the elements because all of the mechanism is entirely enclosed. Thus, dirt, rain, etc., cannot cause wear, rusting and the like as occurs with many prior art systems wherein the raising and lowering mechanism is exposed to the elements.

While the invention is ideally suited for use with storage compartments of a relatively heavy nature (as illustrated in FIG. 2 and just described), as noted above, the cover, if desired, can be in the form of a camper top, such as illustrated in FIG. 8. The camper top can be relatively light in weight or it can be relatively rigid and support peripheral storage cabinets, for examples. Alternatively, the cover can be replaced by a frame 19, as illustrated in FIG. 9, adapted to support any one of a variety of structures, including planar or non-planar tops that in turn support a storage compartment.

While preferred embodiments of the invention have been illustrated and described, it will be appreciated that various changes can be made therein without departing from the spirit and scope of the invention. For example, the chain mechanism connecting the driven and parallel shafts together could be connected to the drive source, rather than the driven shaft being connected to the drive source. Further, rather than a single intermediate member being included in each telescoping column, several intermediate members can be provided, if desired. In such an embodiment, connecting chains would run from the bottom of the immediately preceding intermediate member to the next intermediate (or the end) member. Consequently, the invention can be practiced otherwise than as specifically described herein.

The embodiments of the invention in which an exclusive property or privilege is claimed are defined as follows:

1. A cover apparatus for the cargo bed of pickup trucks, travel trailers and the like comprising:
   (A) a top; and,
   (B) a raising and lowering mechanism coupled to said top for raising and lowering said top, said raising and lowering mechanism comprising:
      (1) a plurality of telescoping columns, each of said telescoping columns including a base member, at least one intermediate member and an end member telescoped together;
      (2) frame means affixed to said base members of said plurality of columns for rigidly mounting said plurality of columns in vertical positions, said top being mounted atop the end members of said plurality of telescoping columns;
      (3) chain/sprocket coupling means running between said telescoping columns and between said base, at least one intermediate and end members of said columns for simultaneously extending and retracting said telescoping columns by simultaneously moving said at least one intermediate member of each of said columns with respect to said base member and said end member of each of said columns with respect to said intermediate member, said chain/sprocket coupling means including a plurality of chains, one of said chains being mounted in each of said base and intermediate members, said chains being positioned such that a selected region of each chain is moved along a vertical path of travel when said chain/sprocket coupling means is actuated, the end member of each of said columns being coupled to said selected region of the chain mounted in the intermediate member within which said end member is mounted and the intermediate member of each of said columns being coupled to said selected region of the chain mounted in the base member within which said intermediate member is mounted; and, (4) drive means connected to said chain/sprocket coupling means for actuating said chain/sprocket coupling means such that said chain/sprocket coupling means simultaneously extends and retracts said telescoping columns by simultaneously moving said plurality of chains.

2. The cover apparatus for the cargo bed of pickup trucks, travel trailers and the like claimed in claim 1 wherein said top is structurally rigid and mounted atop said raising and lowering means and including a storage container hung from said structurally rigid top.

3. The cover apparatus for the cargo bed of pickup trucks, travel trailers and the like claimed in claim 2 wherein said top is planar.

4. The cover apparatus for the cargo bed of pickup trucks, travel trailers and the like claimed in claim 3 wherein said planar top is moved by said raising and lowering means from a lower position whereat said relatively large storage container is surrounded by the side walls of said cargo bed and an upper position whereat said relatively large storage container is high enough so as to be accessible above said side walls.

5. The cover apparatus for the cargo bed of pickup trucks, travel trailers and the like claimed in claim 2 wherein said plurality of telescoping columns is equal to four and wherein said frame means includes two pairs of parallel frame members that are affixed to the base members of pairs of telescoping columns such that said pairs of frame members lie parallel to one another.

6. The cover apparatus for the cargo bed of pickup trucks, travel trailers and the like claimed in claim 5 wherein said chain/sprocket coupling means also includes two shafts, one of said shafts being mounted in one of said frame members of each of said pair of parallel frame members, the ends of said shafts extending into the base members of the columns to which said pairs of parallel frame members are affixed and wherein said chain/sprocket coupling means also includes shaft sprockets connecting the ends of said shafts to the chains mounted in said base members so that said chains move when said shafts are rotated.

7. The cover apparatus for the cargo bed of pickup trucks, travel trailers and the like claimed in claim 6 wherein said drive means includes a drive motor and drive chain/sprocket connecting means for connecting said drive motor to one of said shafts and wherein said chain/sprocket coupling means includes chain/sprocket cross connecting means for connecting said one of said shafts to the other of said shafts.

8. The cover apparatus for the cargo bed of pickup trucks, travel trailers and the like claimed in claim 7 wherein:

said base member of each of said columns includes two elongate chambers separated by a wall, said wall including a slot, said at least one intermediate member of said columns being mounted in one of said chambers and the end of the shaft mounted in the one of said pair of parallel frame members that extends into said base member extending into said other chamber;

said intermediate member of each of said columns includes a flange projecting through the slot in its related base member into said other chamber;

said ones of said plurality of chains mounted in said base members being continuous and located in said other chambers; and, said shaft sprockets being located on the ends of said shafts extending into said other chambers; and, said chain/sprocket coupling means also includes an idler sprocket located in each of said other chambers and spaced from the sprocket mounted on the end of said shaft projecting into said other chambers, said continuous chains being wrapped about said shaft and idler sprockets, said selected regions on said continuous chains being attached to the intermediate member of the related column via said flange.

9. The cover apparatus for the cargo bed of pickup trucks, travel trailers and the like claimed in claim 8 wherein:

said at least one intermediate member of each of said columns includes first and second elongate chambers, said end members of said columns being mounted in one of said elongate chambers, the wall between said chambers including a slot;

said end members including a flange attached to the lower end of said end members and projecting through said slot; and, said chain/sprocket coupling means further includes a sprocket mounted on a stub shaft near the upper end of said other chamber of said at least one intermediate member, one end of the ones of said plurality of chains mounted in said intermediate members connected to said flange of said end member and the other end of said chain connected to the bottom of said base member of the related column, said chains being wrapped about said sprockets mounted on said stub shafts.

10. The cover apparatus for the cargo bed of pickup trucks, travel trailers and the like claimed in claim 1 wherein said plurality of telescoping columns is equal to four and wherein the frame means includes two pairs of parallel frame members that are affixed to the base members of pairs of telescoping columns such that said pairs of frame members lie parallel to one another.

11. The cover apparatus for the cargo bed of pickup trucks, travel trailers and the like claimed in claim 10 wherein said chain/sprocket coupling means also includes to shafts, one of said shafts being mounted in one of said frame members of each of said pair of parallel frame members, the ends of said shafts extending into the base members of the columns to which said pairs of parallel frame members are affixed and wherein said chain/sprocket coupling means also includes shaft sprockets connecting the ends of said shafts to the chains mounted in said base members so that said chains move when said shafts are rotated.

12. The cover apparatus for the cargo bed of pickup trucks, travel trailers and the like claimed in claim 11 wherein said drive means includes a drive motor and drive chain/sprocket connecting means for connecting said drive motor to one of said shafts and wherein said chain/sprocket coupling means includes chain/sprocket cross connecting means for connecting said one of said shafts to the other of said shafts.

13. The cover apparatus for the cargo bed of pickup trucks, travel trailers and the like claimed in claim 12 wherein:

said base member of each of said columns includes two elongate chambers separated by a wall, said wall including a slot, said at least one intermediate member of said columns being mounted in one of said chambers and the end of the shaft mounted in the one of said pair of parallel frame members that extends into said base member extending into said other chamber;

said intermediate member of each of said columns includes a flange projecting through the slot in its related base member into said other chamber;

said ones of said plurality of chains mounted in said base members being continuous and located in said other chamber;

said shaft sprockets being located on the ends of said shafts extending into said other chambers; and, said chain/sprocket coupling means also includes an idler sprocket located in each of said other chambers and spaced from the mounted on the end of said shaft projecting into said other chambers, said continuous chains being wrapped around said shaft and idler sprockets, said selected regions on said continuous chains being attached to the intermediate member of the related column via said flange.

14. The cover apparatus for the cargo bed of pickup trucks, travel trailers and the like claimed in claim 13 wherein:

said at least one intermediate member of each of said columns includes first and second elongate chambers, said end members of said columns being mounted in one of said elongate chambers, the wall between said chambers including a slot;

said end members including a flange attached to the lower end of said end members and projecting through said slot; and, said chain/sprocket coupling means further includes a sprocket mounted on a stub shaft near the upper end of said other chamber of said at least one intermediate member and a chain, one end of the ones of said plurality of chains mounted in said intermediate members connected to said flange of said end member and the other end of said chain connected to the bottom of said base member of the related column, said chains being wrapped about said sprockets mounted on said stub shafts.

15. A raising and lowering mechanism for raising and lowering a top from the cargo bed of pickup trucks, travel trailers and the like, said raising and lowering mechanism comprising:

(1) a plurality of telescoping columns, each of said telescoping columns including a base member, at least one intermediate member and an end member telescoped together;

(2) frame means affixed to said base members of said plurality of columns for rigidly mounting said plurality of columns in vertical positions, said top being mounted atop the end members of said plurality of telescoping columns;

(3) chain/sprocket coupling means running between said telescoping columns and between said base, at least one intermediate and end members of said columns for simultaneously extending and retracting said telescoping columns by simultaneously moving said at least one intermediate member of each of said columns with respect to said base member and said end member of each of said columns with respect to said intermediate member, said chain/sprocket coupling means including a plurality of chains, one of said chains being mounted in each of said base and intermediate members, said chains being positioned such that a selected region of each chain is moved along a vertical path of travel when said chain/sprocket coupling means is actuated, the end member of each of said columns being coupled to said selected region of the chain mounted in the intermediate member within which said end member is mounted and the intermediate member of each of said columns being coupled to said selected region of the chain mounted in the base member within said intermediate member is mounted; and, (4) drive means connected to said chain/sprocket coupling means for actuating said chain/sprocket coupling means such that said chain/sprocket coupling means simultaneously extends and retracts said telescoping columns by simultaneously moving said plurality of chains.

16. The raising and lowering mechanism claimed in claim 15 wherein said plurality of telescoping columns is equal to four and wherein said frame means includes two pairs of parallel frame members that are affixed to the base members of pairs of telescoping columns such that said pairs of frame members lie parallel to one another.

17. The raising and lowering mechanism claimed in claim 16 wherein said chain/sprocket coupling means also includes two shafts, one of said shafts being mounted in one of said frame members of each of said pair of parallel frame members, the ends of said shafts extending into the base members of the columns to which said pairs of parallel frame members are affixed and wherein said chain/sprocket coupling means also includes shaft sprockets connecting the ends of said shafts to the chains mounted in said base members so that said chains move when said shafts are rotated.

18. The raising and lowering mechanism claimed in claim 17 wherein said drive means includes a drive motor and drive chain/sprocket connecting means for connecting said drive motor to one of said shafts and wherein said chain/sprocket coupling means includes chain/sprocket cross connecting means for connecting said one of said shafts to the other of said shafts.

19. The raising and lowering mechanism claimed in claim 18 wherein:

said base member of each of said columns include two elongate chambers separated by a wall, said wall including a slot, said at least one intermediate member of said columns being mounted in one of said chambers and the end of the shaft mounted in the one of said pair of parallel frame members that extends into said base member extending into said other chamber;

said intermediate member of each of said columns includes a flange projecting through the slot in its related base member into said other chamber;

said ones of said plurality of chains mounted in said base members being continuous and located in said other chamber;

said shaft sprockets being located on the ends of said shafts extending into said other chambers; and, said chain/sprocket coupling means also includes an idler sprocket located in each of said other chambers and spaced from the sprocket mounted on the end of said shaft projecting into said other chambers, said continuous chains being wrapped around said shaft and idler sprocket, said selected regions on said continuous chains being attached to the intermediate member of the related column via said flange.

20. The raising and lowering mechanism claimed in claim 19 wherein:

said end members including a flange attached to the lower end of said end members and projecting through said slot; and, said chain/sprocket coupling means further includes a sprocket mounted on a stub shaft near the upper end of said other chamber of said at least on intermediate member, one end of the ones of said plurality of chains mounted in said intermediate members connected to said flange of said end member and the other end of said chain connected to the bottom of said base member of the related column, said chains being wrapped about said sprockets mounted on said stub shafts.

* * * * *